US012722205B2

(12) United States Patent
Adcock et al.

(10) Patent No.: US 12,722,205 B2
(45) Date of Patent: Sep. 1, 2026

(54) SYSTEM AND METHOD FOR ELIMINATING SURFACE DEFECTS IN AN ADDITIVELY MANUFACTURED COMPONENT

(71) Applicant: General Electric Company, Schenectady, NY (US)

(72) Inventors: Thomas Charles Adcock, Glenville, NY (US); Brian Scott McCarthy, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 722 days.

(21) Appl. No.: 18/301,348

(22) Filed: Apr. 17, 2023

(65) Prior Publication Data

US 2024/0342801 A1 Oct. 17, 2024

(51) Int. Cl.

| | |
|---|---|
| ***B22F 10/85*** | (2021.01) |
| ***B22F 10/28*** | (2021.01) |
| ***B22F 10/366*** | (2021.01) |
| ***B22F 12/45*** | (2021.01) |
| ***B22F 12/49*** | (2021.01) |
| ***B22F 12/90*** | (2021.01) |
| ***B23K 26/06*** | (2014.01) |

(Continued)

(52) U.S. Cl.

CPC .............. *B22F 10/85* (2021.01); *B22F 10/28* (2021.01); *B22F 10/366* (2021.01); *B22F 12/45* (2021.01); *B22F 12/49* (2021.01); *B22F 12/90* (2021.01); *B23K 26/0604* (2013.01); *B23K 26/342* (2015.10); *B33Y 10/00* (2014.12); *B33Y 30/00* (2014.12); *B33Y 50/02* (2014.12); *B22F 2998/10* (2013.01)

(58) Field of Classification Search

CPC ........ B22F 10/85; B22F 10/28; B22F 10/366; B22F 12/45; B22F 12/49; B22F 12/90; B22F 2998/10; B23K 26/0604; B23K 26/342; B33Y 10/00; B33Y 30/00; B33Y 50/02; Y02P 10/25; B29C 64/153; B29C 64/268; B29C 64/277; B29C 64/282; B29C 64/393

USPC .......................................................... 700/119

See application file for complete search history.

(56) References Cited

U.S. PATENT DOCUMENTS

| | | | |
|---|---|---|---|
| 10,589,382 | B2 | 3/2020 | Roerig et al. |
| 10,682,725 | B2 | 6/2020 | Ghabchi et al. |

(Continued)

*Primary Examiner* — Michael J Brown

(74) *Attorney, Agent, or Firm* — Wood Herron & Evans LLP

(57) ABSTRACT

An additive manufacturing system and a method for manufacturing a solid component with the additive manufacturing system is provided. The method includes determining a misalignment vector field having a plurality of misalignment vectors. The method further includes identifying one or more potential stitching positions where the solid component is generally tangent to one or more misalignment vectors. The method further includes generating a plurality of first hatching paths, a plurality of second hatching paths, and one or more stitching regions. The method further includes selectively directing the first laser beam across a powder bed along the plurality of first hatching paths to consolidate a first portion of the solid component. The method further includes selectively directing the second laser beam across the powder bed along the plurality of second hatching paths to consolidate a second portion of the solid component.

18 Claims, 9 Drawing Sheets

(51) Int. Cl.

| | |
|---|---|
| ***B23K 26/342*** | (2014.01) |
| ***B33Y 10/00*** | (2015.01) |
| ***B33Y 30/00*** | (2015.01) |
| ***B33Y 50/02*** | (2015.01) |
| *B29C 64/393* | (2017.01) |

(56) References Cited

U.S. PATENT DOCUMENTS

| | | | | |
|---|---|---|---|---|
| 11,016,470 | B2 | 5/2021 | Marinov et al. | |
| 11,260,600 | B2 | 3/2022 | Dicken et al. | |
| 11,407,170 | B2 | 8/2022 | McCarthy et al. | |
| 2020/0180216 | A1 | 6/2020 | Beck et al. | |
| 2020/0261977 | A1 | 8/2020 | Mamrak et al. | |
| 2020/0276764 | A1 | 9/2020 | McCarthy et al. | |
| 2021/0016394 | A1 | 1/2021 | McCarthy et al. | |
| 2021/0187830 | A1 | 6/2021 | McCarthy et al. | |
| 2022/0161502 | A1 | 5/2022 | Umang et al. | |
| 2024/0075529 | A1 | 3/2024 | Cavalcabo et al. | |
| 2024/0278495 | A1* | 8/2024 | Werner | B33Y 80/00 |

* cited by examiner

SYSTEM AND METHOD FOR ELIMINATING SURFACE DEFECTS IN AN ADDITIVELY MANUFACTURED COMPONENT

FIELD

The present disclosure relates generally to additive manufacturing systems, and more particularly, to systems and methods for eliminating surface defects in an additively manufactured component.

BACKGROUND

At least some additive manufacturing systems involve the buildup of a powdered material to make a component. These techniques can produce complex components from powder materials at a reduced cost and with improved manufacturing efficiency. At least some known additive manufacturing systems, such as DMLM systems, fabricate components using a plurality of laser devices, a build plate, a recoater, and a powder material, such as, without limitation, a powdered metal. The laser devices each generate a laser beam that melts the powder material on the build plate in and around the area where the laser beam is incident on the powder material, resulting in a melt pool. The melt pool cools into a consolidated, solid top layer of the component. Multiple portions of the component may be manufactured simultaneously using multiple lasers. As such, multiple lasers reduce manufacturing time and reduce the cost to produce the component.

Misalignment can occur in multi-laser additive manufacturing systems, which can lead to defects in the printed parts. Laser misalignment occurs when the beams of the lasers are not properly aligned with each other or with the build plate, causing them to overlap in unintended ways. This can result in inconsistent melting and bonding of the metal powder, leading to voids, cracks, or other defects in the printed part.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
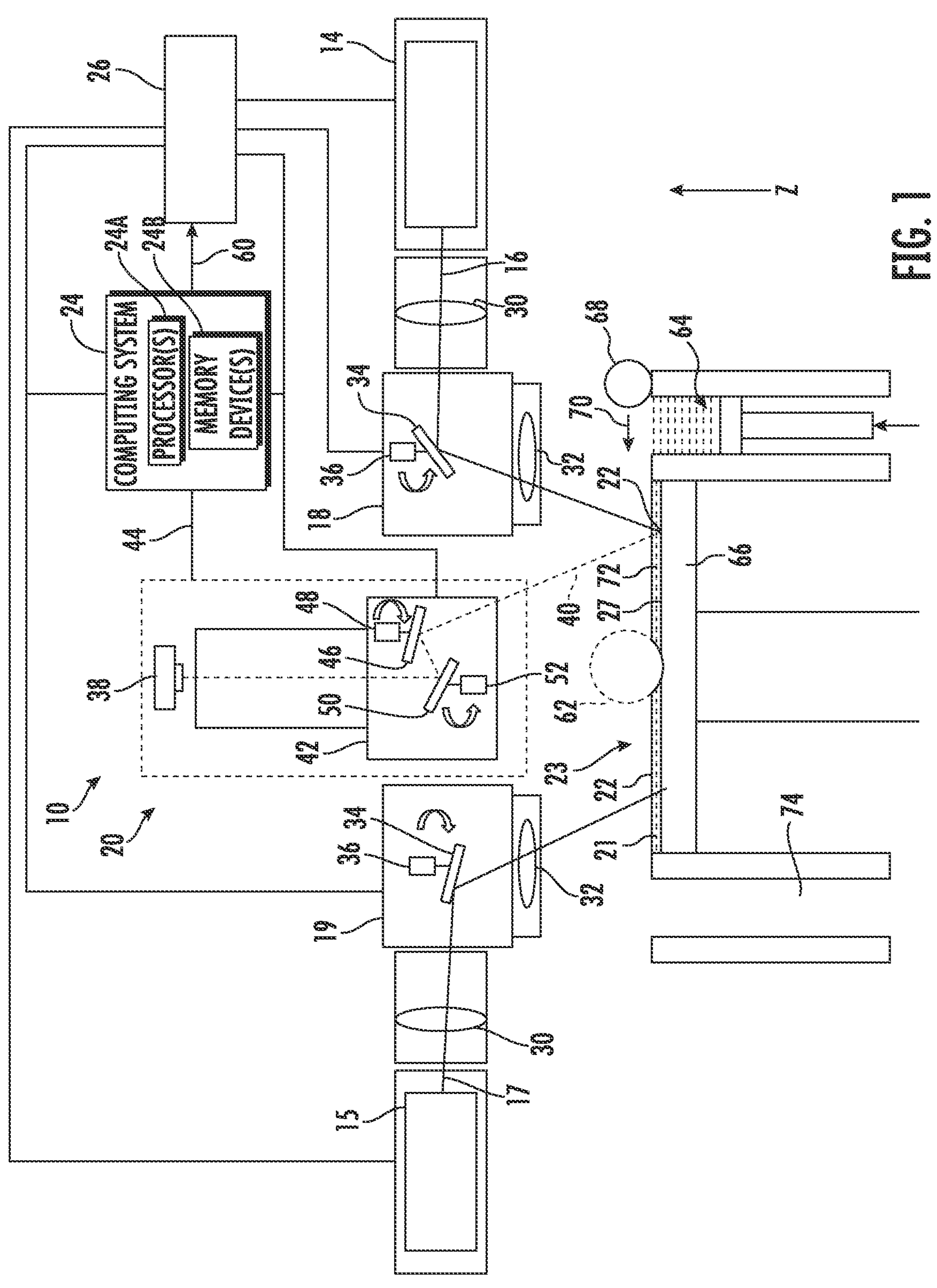
FIG. 1 is a schematic view of an exemplary additive manufacturing system shown in the form of a direct metal laser melting (DMLM) system including multiple lasers and a monitoring system, in accordance with exemplary embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Terms of approximation, such as "generally," "substantially," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise. Additionally, in another example "generally parallel" includes angles within ten degrees of parallel in either direction (e.g., within a given plane), e.g., clockwise or counter-clockwise. Further, "generally tangent" includes directions within ten degrees of tangent in either direction (e.g., within a given plane), such as clockwise or counter-clockwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In multi-laser additive manufacturing systems, a plurality of lasers are used to speed up the process and increase production capacity. However, misalignment can occur in multi-laser systems, which can lead to defects in the printed parts. Laser misalignment occurs when the beams of the lasers are not properly aligned with each other or with the build plate, causing them to overlap in unintended ways. This can result in inconsistent melting and bonding of the metal powder, leading to voids, cracks, or other defects in the printed part. These defects are particularly troublesome on the surface or contour of the component.

The present disclosure is generally related to an additive manufacturing system and method for manufacturing a solid component that minimizes or entirely eliminates surface defects caused by laser misalignment. This is done by constraining the laser stitching regions to locations where the misalignment is tangent to the surface (or tangent to a centerline of the component). The method may include determining the misalignment for a given laser pair at each location on the build plate and subsequently identifying stitching locations at positions where the misalignment is tangent to the surface of the component in order to reduce surface defects.

Referring now to the drawings, wherein identical numerals indicate the same elements throughout the figures, FIG. 1 shows a schematic/block view of an additive manufacturing system 10 for generating a solid component 62. The additive manufacturing system 10 may be configured for direct metal laser sintering (DMLS) or direct metal laser melting (DMLM). Although the embodiments herein are described with reference to a DMLM system or DMLS system, this disclosure also applies to other types of additive manufacturing systems, such as selective laser sintering systems.

In the exemplary embodiment, additive manufacturing system 10 includes a build plate 66, a plurality of laser devices 14, 15 configured to generate laser beams 16, 17, a plurality of laser scanning devices 18, 19 configured to selectively direct laser beams 16, 17 across build plate 66, and an optical system 20 for monitoring a melt pool 22 created by laser beams 16, 17. The exemplary additive manufacturing system 10 further includes a computing system 24 and a controller 26 configured to control one or more components of additive manufacturing system 10, as described in more detail herein.

A build material 21 includes materials suitable for forming a solid component 62, such as a powdered build material, which may include, without limitation, gas atomized alloys of cobalt, iron, aluminum, titanium, nickel, and combinations thereof. In other embodiments, build material 21 includes any suitable type of powdered build material. In yet other embodiments, build material 21 includes any suitable build material that enables additive manufacturing system 10 to function as described, including, for example and without limitation, ceramic powders, metal-coated ceramic powders, and thermoset or thermoplastic resins. Build material 21 is spread across build plate 66 to form a powdered bed 27. Build material 21 within powdered bed 27 is then melted and re-solidified during the additive manufacturing process to build a solid component 62 on build plate 66.

For example, the solid component 62 may be fabricated in a layer-by-layer manner by sintering or melting the build material 21 in a powder bed 23 using the laser beams 16, 17. The powder to be melted by the energy beam is supplied by reservoir 64 and spread evenly over a build plate 66 using a recoater arm 68, which moves in a recoater direction 70, to maintain the powder at a powder level 72 and to remove excess powder material extending above the powder level 72 to waste container 74. The laser beams 16, 17 sinters or melts a cross sectional layer of the solid component 62 being built under control of the laser scanning devices 18, 19. The build plate 66 is lowered, and another layer of powder is spread over the build plate and the solid component 62 being built, followed by successive melting/sintering of the powder by the laser beams 16,17. The process is repeated until the solid component 62 is completely built up from the melted/sintered build material 21. After fabrication of the solid component 62 is complete, various post-processing procedures may be applied to the solid component 62. Post processing procedures include removal of excess powder by, for example, blowing or vacuuming.

As shown in FIG. 1, each laser device 14, 15 is configured to generate a laser beam 16, 17 of sufficient energy to at least partially melt build material 21 of build plate 66. In the exemplary embodiment, laser devices 14, 15 are a yttrium-based solid state laser configured to emit a laser beam having a wavelength of about 1070 nanometers (nm). In other embodiments, laser devices 14, 15 includes any suitable type of laser that enables additive manufacturing system 10 to function as described herein, such as a carbon dioxide laser. Further, although additive manufacturing system 10 is shown and described as including two laser devices 14, 15, additive manufacturing system 10 may include any combination of laser devices that enable additive manufacturing system 10 to function as described herein including, without limitation, two, three, four, or more laser devices. In one embodiment, for example, additive manufacturing system 10 includes a first laser device 14 having a first power and a second laser device 15 having a second power different from the first laser power, or at least two laser devices having substantially the same power output. In yet other embodiments, additive manufacturing system 10 includes three laser devices. In yet other embodiments, additive manufacturing system 10 includes four laser devices.

Laser devices 14, 15 are optically coupled to optical elements that facilitate focusing laser beams 16, 17 on build plate 66. In the exemplary embodiment, the optical elements include a beam collimator 30 disposed between laser devices 14, 15 and laser scanning devices 18, 19, and an F-theta lens 32 disposed between the laser scanning devices 18, 19 and build plate 66. In other embodiments, additive manufacturing system 10 includes any suitable type and arrangement of optical elements that provide a collimated and/or focused laser beam on build plate 66.

Laser scanning devices 18, 19 are configured to direct laser beams 16, 17 across selective portions of build plate 66 to create solid component 62. In the exemplary embodiment, laser scanning devices 18, 19 are galvanometer scanning devices including a mirror 34 operatively coupled to a galvanometer-controlled motor 36 (broadly, an actuator). Motor 36 is configured to move (specifically, rotate) mirror 34 in response to signals received from controller 26, and thereby deflect laser beams 16, 17 across selective portions of build plate 66. Mirror 34 includes any suitable configuration that enables mirror 34 to deflect laser beams 16, 17 towards build plate 66. In some embodiments, mirror 34 includes a reflective coating that has a reflectance spectrum that corresponds to the wavelength of laser beams 16, 17.

Although laser scanning devices 18, 19 are illustrated with a single mirror 34 and a single motor 36, laser scanning devices 18, 19 include any suitable number of mirrors and motors that enable the laser scanning devices 18, 19 to function as described herein. In one embodiment, for example, laser scanning devices 18, 19 include two mirrors and two galvanometer-controlled motors, each operatively coupled to one of the mirrors. In yet other embodiments, laser scanning devices 18, 19 include any suitable scanning device that enables additive manufacturing system 10 to function as described herein, such as, for example, two-dimension (2D) scan galvanometers, three-dimension (3D) scan galvanometers, and dynamic focusing galvanometers.

Optical system 20 is configured to detect electromagnetic radiation generated by melt pool 22 and transmit information about melt pool 22 to computing system 24. Specifically, optical system 20 detects the location of laser beams 16, 17 in melt pool 22. In the exemplary embodiment, optical system 20 includes a first optical detector 38 configured to detect electromagnetic radiation 40 (also referred to as "EM radiation") generated by melt pool 22, and an optical scanning device 42 configured to direct EM radiation 40 to first optical detector 38. More specifically, first optical detector 38 is configured to receive EM radiation 40 generated by melt pool 22 and generate an electrical signal 44 in response thereto. First optical detector 38 is communicatively coupled to computing system 24 and is configured to transmit electrical signal 44 to computing system 24.

First optical detector 38 includes any suitable optical detector that enables optical system 20 to function as described herein, including, for example and without limitation, a photomultiplier tube, a photodiode, an infrared camera, a charged-couple device (CCD) camera, a CMOS camera, a pyrometer, or a high-speed visible-light camera. Although optical system 20 is shown and described as including a single first optical detector 38, optical system 20 includes any suitable number and type of optical detectors that enables additive manufacturing system 10 to function as described herein. In one embodiment, for example, optical system 20 includes a first optical detector configured to detect EM radiation within an infrared spectrum, and a second optical detector configured to detect EM radiation within a visible-light spectrum. In embodiments including more than one optical detector, optical system 20 includes a beam splitter (not shown) configured to divide and deflect EM radiation 40 from melt pool 22 to a corresponding optical detector.

While optical system 20 is described as including "optical" detectors for EM radiation 40 generated by melt pool 22, it should be noted that use of the term "optical" is not to be equated with the term "visible." Rather, optical system 20 is configured to capture a wide spectral range of EM radiation. For example, first optical detector 38 may be sensitive to light with wavelengths in the X-ray spectrum (about 0.1-10 nanometers (nm)) ultraviolet spectrum (about 10-400 nm), the visible spectrum (about 400-700 nm), the near-infrared spectrum (about 700-1,200 nm), and the infrared spectrum (about 1,200-10,000 nm). Further, because the type of EM radiation emitted by melt pool 22 depends on the temperature of melt pool 22, optical system 20 is capable of monitoring and measuring both a size and a temperature of melt pool 22.

Optical scanning device 42 is configured to direct EM radiation 40 generated by melt pool 22 to first optical detector 38. In the exemplary embodiment, optical scanning device 42 is a galvanometer scanning device including a first mirror 46 operatively coupled to a first galvanometer-controlled motor 48 (broadly, an actuator), and a second mirror 50 operatively coupled to a second galvanometer-controlled motor 52 (broadly, an actuator). First galvanometer-controlled motor 48 and second galvanometer-controlled motor 52 are configured to move (specifically, rotate) first mirror 46 and second mirror 50, respectively, in response to signals received from controller 26 to deflect EM radiation 40 from melt pool 22 to first optical detector 38. First mirror 46 and second mirror 50 have any suitable configuration that enables first mirror 46 and second mirror 50 to deflect EM radiation 40 generated by melt pool 22. In some embodiments, one or both of first mirror 46 and second mirror 50 includes a reflective coating that has a reflectance spectrum that corresponds to EM radiation that first optical detector 38 is configured to detect.

Although optical scanning device 42 is illustrated and described as including two mirrors and two motors, optical scanning device 42 may include any suitable number of mirrors and motors that enable the optical system 20 to function as described herein. Further, optical scanning device 42 may include any suitable scanning device that enables optical system 20 to function as described herein, such as, for example, two-dimension (2D) scan galvanometers, three-dimension (3D) scan galvanometers, and dynamic focusing galvanometers.

Still referring to FIG. 1, the computing system 24 is shown as a block diagram to illustrate the suitable components that may be included within the computing system 24. As shown, the computing system 24 may include one or more processor(s) 24A and associated memory device(s) 24B configured to perform a variety of computer-implemented functions (e.g., performing the methods, steps, calculations and the like and storing relevant data as disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 24B may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 24B may generally be configured to store suitable computer-readable instructions that, when implemented by the processor(s) 24A, configure the computing system 24 to perform various functions and/or operations, including, but not limited to, various steps in the exemplary method described below.

The processor 24A of the computing system 24 may execute instructions to operate additive manufacturing system 10. The computing system 24 includes (e.g., stored in the memory device 24B) a calibration model of additive manufacturing system 10 and an electronic computer build file associated with a component, such as the solid component 62. The calibration model includes, without limitation, an expected or desired melt pool size and temperature under a given set of operating conditions (e.g., a power of laser device 14) of additive manufacturing system 10. The build file includes build parameters that are used to control one or more components of additive manufacturing system 10. Build parameters include, without limitation, a power of laser device 14, a scan speed of laser scanning device 18, a position and orientation of laser scanning device 18 (specifically, mirror 34), a scan speed of optical scanning device 42, and a position and orientation of optical scanning device 42 (specifically, first mirror 46 and second mirror 50). In the exemplary embodiment, computing system 24 and controller 26 are shown as separate devices. In other embodiments, computing system 24 and controller 26 are combined as a single device that operates as both computing system 24 and controller 26 as each are described herein.

In the exemplary embodiment, computing system 24 is also configured to operate at least partially as a data acquisition device and to monitor the operation of additive manufacturing system 10 during fabrication of component 28. In one embodiment, for example, computing system 24 receives and processes the electrical signals 44 from first optical detector 38. Computing system 24 stores information associated with component 28 based on electrical signals 44, is the information used to facilitate controlling and refining a build process for additive manufacturing system 10 or for a specific component built by additive manufacturing system 10.

Further, computing system 24 is configured to adjust one or more build parameters in real-time based on electrical signals 44 received from first optical detector 38. For example, as additive manufacturing system 10 builds the component 28, computing system 24 processes the electrical signals 44 from first optical detector 38 using data processing algorithms to determine the size and location of portions of component 28. Computing system 24 compares the size and location of portions of component 28 to an expected or desired size and location of component 28 based on a calibration model. Computing system 24 generates control signals 60 that are fed back to controller 26 and used to adjust one or more build parameters in real-time to correct discrepancies in the size and location of component 28.

Controller 26 includes any suitable type of controller that enables additive manufacturing system 10 to function as described herein. In one embodiment, for example, controller 26 is a computer system that includes at least one processor and at least one memory device that executes executable instructions to control the operation of additive manufacturing system 10 based at least partially on instructions from human operators. Controller 26 includes, for example, a 3D model of component 28 to be fabricated by additive manufacturing system 10. Executable instructions executed by controller 26 include controlling the power output of laser devices 14, 15, controlling a position and scan speed of laser scanning devices 18, 19, and controlling a position and scan speed of optical scanning device 42. Controller 26 is configured to control one or more components of additive manufacturing system 10 based on build parameters associated with a build file stored, for example, within computing system 24. In the exemplary embodiment, controller 26 is configured to control the laser scanning devices 18, 19 based on a build file associated with a component to be fabricated with additive manufacturing system 10. More specifically, controller 26 is configured to control the position, movement, and scan speed of mirror 34 using motor 36 based upon a predetermined path defined by a build file associated with component 28. Controller 26 is also configured to control other components of additive manufacturing system 10, including, without limitation, laser devices 14, 15. In one embodiment, for example, controller 26 controls the power output of laser devices 14, 15 based on build parameters associated with a build file.

In the exemplary embodiment, controller 26 is also configured to control the optical scanning device 42 to direct EM radiation 40 from melt pool 22 to first optical detector 38. Controller 26 is configured to control the position, movement, and scan speed of first mirror 46 and second mirror 50 based on at least one of the position of mirror 34 of laser scanning device 18 and the position of melt pool 22. In one embodiment, for example, the position of mirror 34 at a given time during the build process is determined, using computing system 24 and/or controller 26, based upon a predetermined path of a build file used to control the position of mirror 34. Controller 26 controls the position, movement, and scan speed of first mirror 46 and second mirror 50 based upon the determined position of mirror 34. In another embodiment, laser scanning devices 18, 19 are configured to communicate the position of mirror 34 to controller 26 and/or computing system 24, for example, by outputting position signals to controller 26 and/or computing system 24 that correspond to the position of mirror 34. In yet another embodiment, controller 26 controls the position, movement, and scan speed of first mirror 46 and second mirror 50 based on the position of melt pool 22. The location of melt pool 22 at a given time during the build process is determined, for example, based upon the position of mirror 34.

Figure 2:
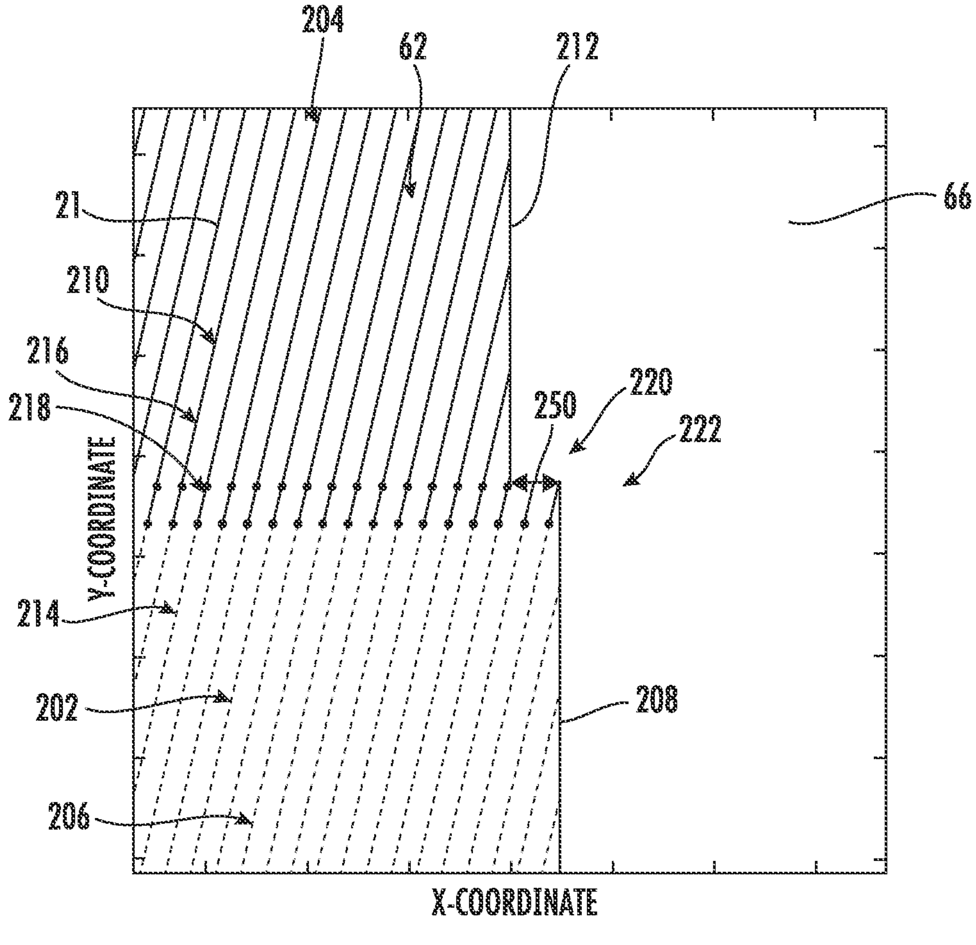
FIG. 2 is a top view of the build plate and the powdered build material shown in FIG. 1 in an x-y coordinate system.

FIG. 2 is a top view of build plate 66 and build material 21 in an x-y coordinate system. Laser scanning device 18 directs a first laser beam 16 across build plate 66 and build material 21 along a first set of laser beam paths 202, and laser scanning device 19 directs a second laser beam 17 across build plate 66 and build material 21 along a second set of laser beam paths 204. First set of laser beam paths 202 includes a plurality of first hatching paths 206 and at least one first contour path 208, and second set of laser beam paths 204 includes a plurality of second hatching paths 210 and at least one second contour path 212. Contour paths 208 and 212 are laser beam paths that follow the contour, or outer surface, of solid component 62 while hatching paths 206 and 210 are laser beam paths within a solid portion of solid component 62. Accordingly, first laser beam 16 consolidates a first portion 214 of solid component 62 while second laser beam 17 consolidates a second portion 216 of solid component 62.

As shown in FIG. 2, first hatching paths 206 and second hatching paths 210 at least partially overlap each other in the y-direction in a stitching region 218. Additionally, first contour path 208 and second contour path 212 also at least partially overlap each other in the y-direction in stitching region 218. Stitching region 218 seamlessly couples the first portion 214 of solid component 62 to second portion 216 of solid component 62. As such, stitching region 218 enables first laser beam 16 to manufacture first portion 214 of solid component 62 and second laser beam 17 to manufacture second portion 216 of solid component 62 at the same time, decreasing manufacturing time and decreasing manufacturing costs.

However, as shown in FIG. 2, laser scanning device 18 and laser scanning device 19 may be misaligned such that first hatching paths 206 and second hatching paths 210 are misaligned in the x-direction and first contour path 208 and second contour path 212 are also misaligned in the x-direction (i.e., offset from one another). That is, first hatching paths 206 and second hatching paths 210 are misaligned along a misalignment vector 250 and first contour path 208 and second contour path 212 are also misaligned along the misalignment vector 250. The misalignment along the misalignment vector 250 causes a step or sharp corner 220 in the solid component 62, or a sharp raised portion, on a contour 222 of solid component 62 that is supposed to be continuous and smooth.

Figure 3:
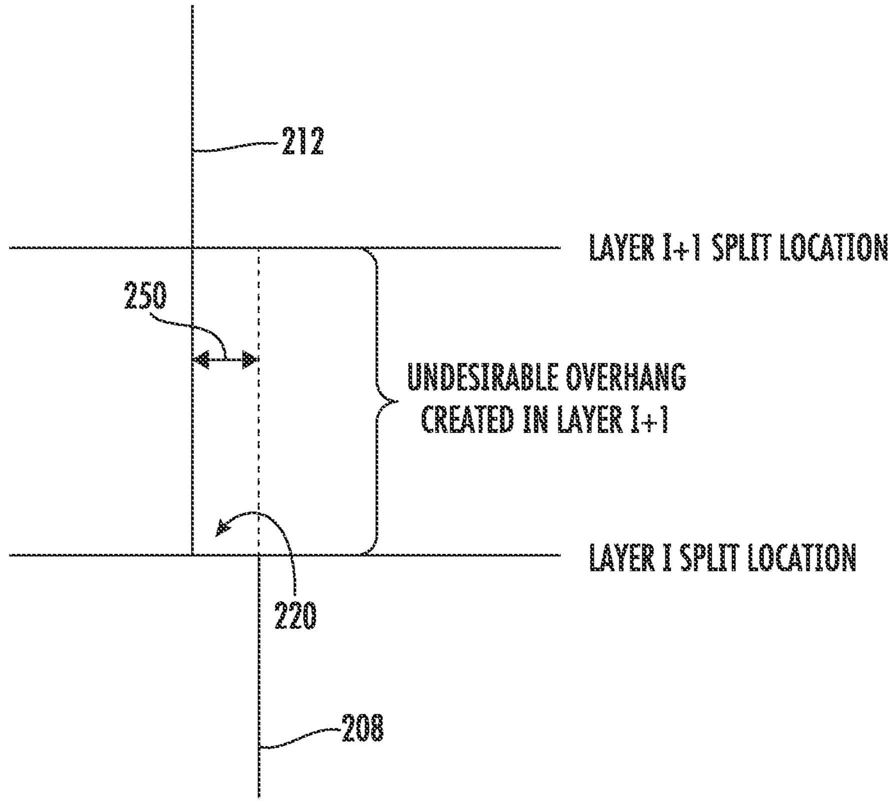
FIG. 3 is a diagram illustrating misalignment between a layer i of powdered build material and a subsequent layer i+1 of powdered build material on the build plate and the powdered build material shown in FIG. 2.

FIG. 3 is a diagram illustrating misalignment between a layer i of build material 21 and a subsequent layer i+1 of build material 21 consolidated on top of layer i. Because the laser scanning devices 18, 19 can become misaligned between consolidation of subsequent layers of build material 21, the location of the misalignment illustrated in FIG. 3 may vary in the z-direction (the direction extending out of the page in FIG. 2) from layer i of build material 21 to layer i+1 of build material 21 and create misalignments in the z-direction as well as the x-y directions. That is, the misalignment vector 250 may be oriented along the z-direction and/or the x-y directions. For example, laser scanning devices 18, 19 may be misaligned such that layer i of build material 21 includes step 220 in the z-direction.

Figure 4:
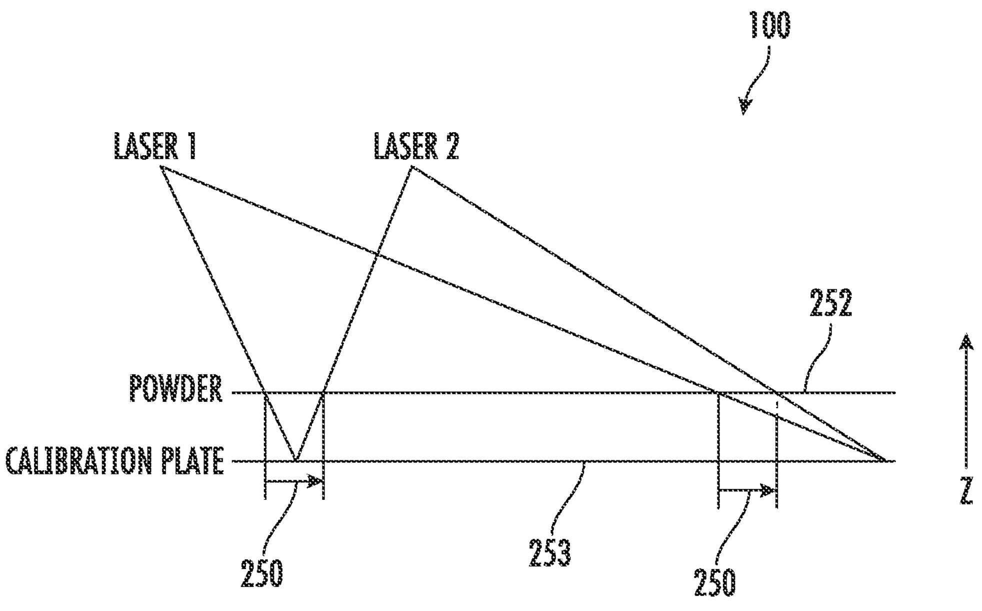
FIG. 4 is a representation of potential error sources in an additive manufacturing system.

FIG. 4 depicts a representation of potential error sources in an additive manufacturing system 10. The height, tilt, and/or flatness of the powder bed relative to the origin of the beam can cause alignment and scaling issues in the scan field. FIG. 4 includes two laser beams (e.g., laser 1 and laser 2). During calibration of an additive manufacturing system 10, the scan system is typically set to a fixed height above the powder bed, which is used as a reference point for the laser beams. However, due to factors such as thermal expansion or mechanical deformation, the actual height of the powder bed can vary from the calibrated height. This can cause a mismatch between the laser beam focus and the actual position of the powder bed, which can result in misaligned or distorted features in the printed part (e.g., the step 220 shown in FIG. 2).

As shown in FIG. 4, discrepancies between the powder bed surface plane 252 and the calibration plate 253 can introduces a beam alignment error along the z-axis. At the powder bed surface plane 252, the z-axis beam alignment error can cause a misalignment along a misalignment vector 250. The misalignment vector 250 may extend from the location where the first laser intersects the powder bed surface plane 252 to the location where the second laser intersects the powder bed surface plane 252. This misalignment along the misalignment vector 250 can cause a seam where the two energy beams meet, which can result in the step 220 at the contour of the component as shown in FIG. 2.

The subject application relates to a system and method for preventing the step or sharp corner 220 caused by the misalignment of the two contour paths 208, 212. Particularly, the system and method prevent the step or sharp corner 220 introduced by z-axis beam alignment error caused by discrepancies between the powder bed surface plane 252 and the calibration plate 253. As discussed below, the method includes determining the misalignment vector 250 (or a misalignment vector field 300), based at least partially on historical data on alignment error, model data, and/or laser positions. Once the misalignment vector 250 is determined (or the misalignment vector field 300 is determined), the method may include generating stitch zones at locations on the solid component where one or more of the misalignment vectors 250 in the misalignment vector field 300 is parallel to a wall or portion of the solid component. By positioning the stitch zones at these locations, the surface defects of the solid component (e.g., the steps 220) can be reduced and/or entirely eliminated.

Figure 5:
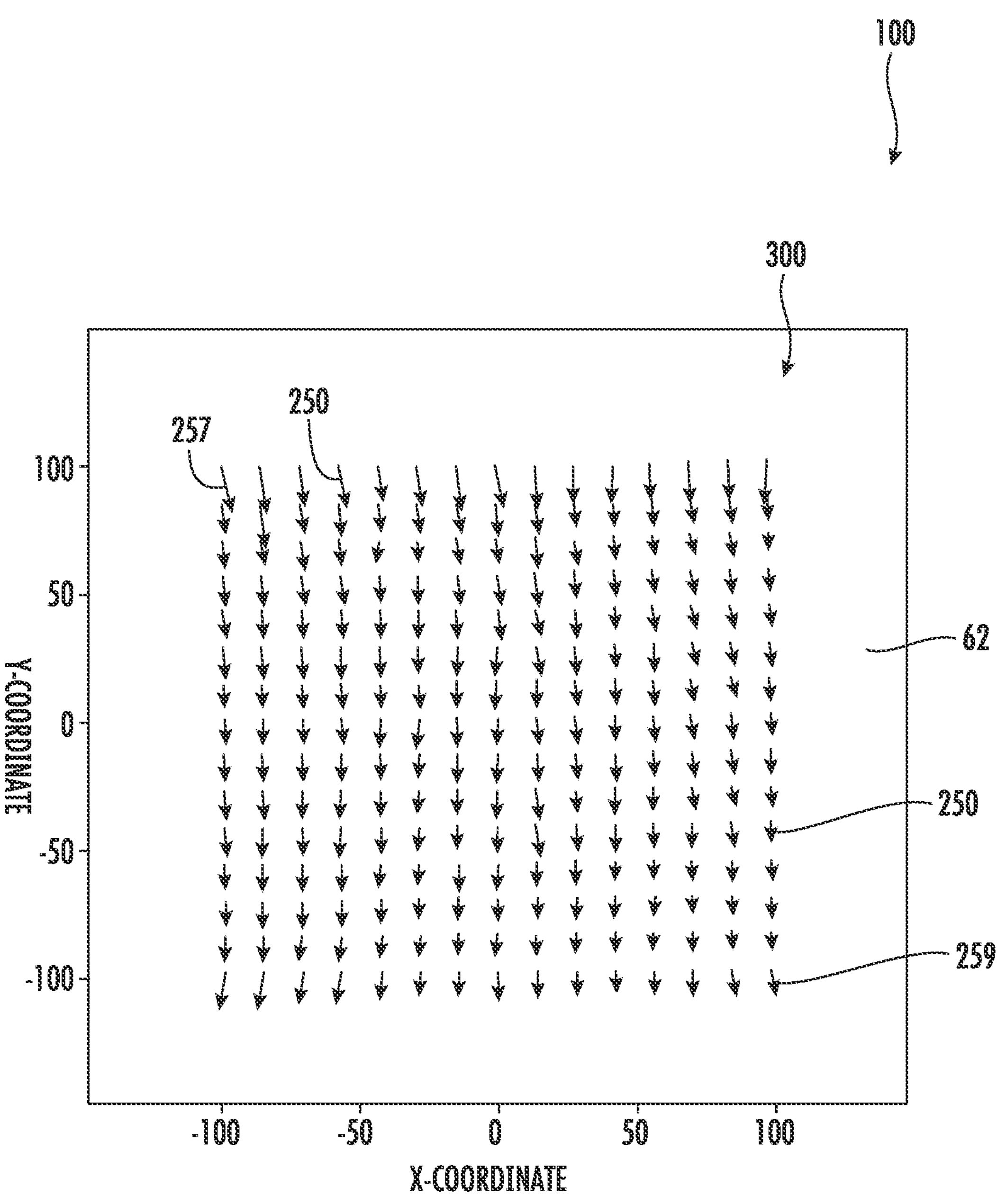
FIG. 5 is a top view of an additive manufacturing system, in which a misalignment vector field for a laser pair is overlayed on a build plate, in accordance with an exemplary aspect of the present disclosure.

FIG. 5 illustrates one non-limiting example of a misalignment vector field 300 for a laser pair (e.g., a first laser and a second laser) on a build plate 66 of an additive manufacturing system 10. As shown, the misalignment vector field 300 may include a plurality of misalignment vectors 250, which may vary in magnitude and/or direction depending on the location that the laser pair is directed on the build plate 66. For example, if the laser pair is directed at a first location, e.g., at an (x, y) position of (−100, 100), a first misalignment vector 257 in the plurality of misalignment vectors 250 associated with this laser pair at the first position on the build plate may have a first direction and a first magnitude. Further, if the laser pair is directed at second location different than the first location, e.g., at an (x, y) position of (100, −100), a second misalignment vector 259 associated with this laser pair at the second position on the build plate may have a second direction and a second magnitude. Accordingly, the misalignment vector for a laser pair in an additive manufacturing system 10 may vary depending on the location on the build plate 66 that the laser pair is directed.

Figure 6:
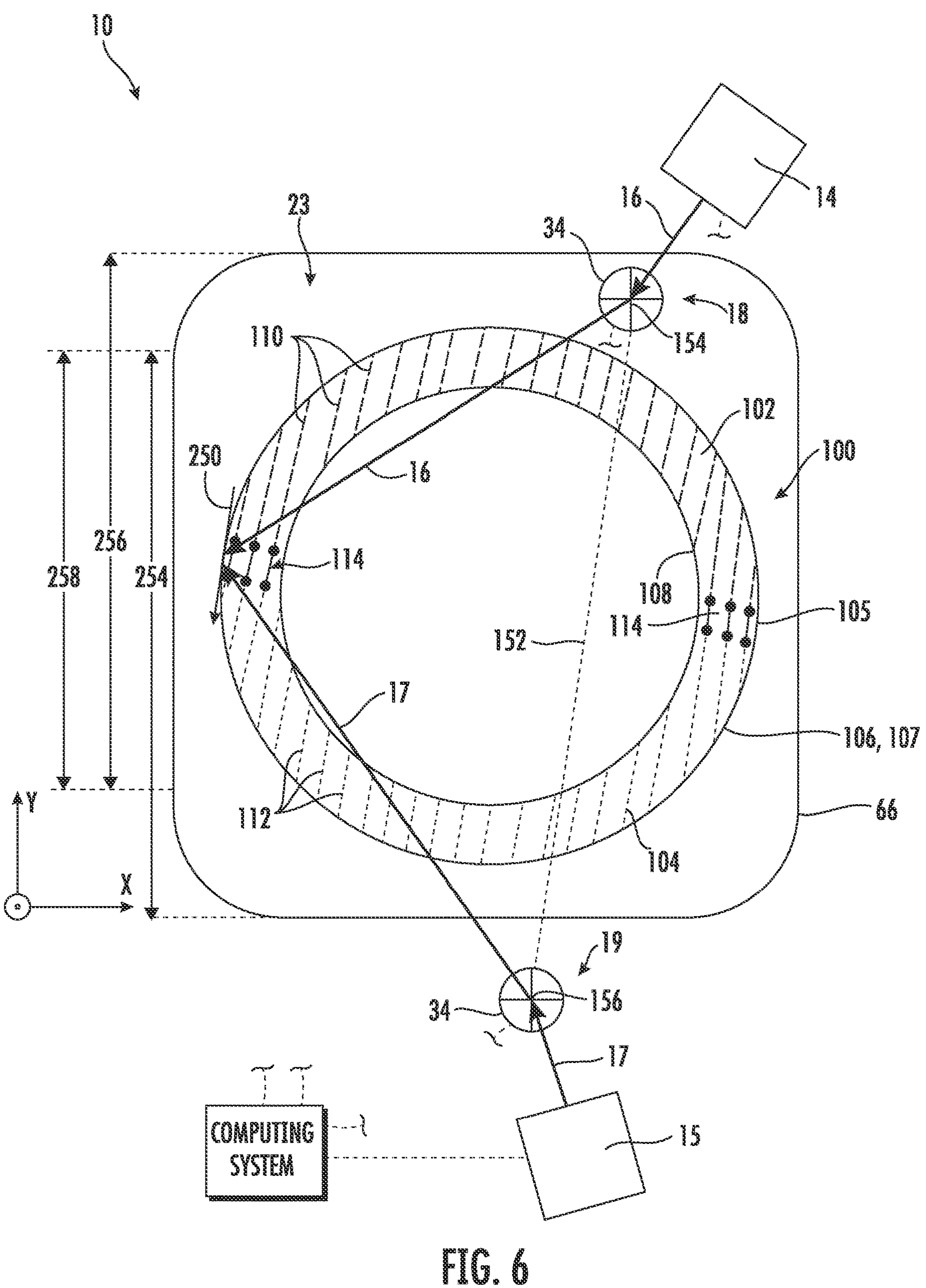
FIG. 6 is a top view an additive manufacturing system, in accordance with an exemplary aspect of the present disclosure.

Referring now to FIG. 6, an additive manufacturing system 10 is illustrated in accordance with embodiments of the present disclosure. As shown, the additive manufacturing system 10 includes a build plate 66, a powder bed 23 on the build plate 66, at least two laser devices 14, 15 configured to generate laser beams 16, 17, and at least two of laser scanning devices 18, 19 configured to selectively direct laser beams 16, 17 across the powder bed 23 (e.g., via a mirror 34 attached to a motor 36 as shown in FIG. 1). For example, the first laser device 14 may be configured to generate the first laser beam 16 for consolidating (or irradiating, or fabricating) a first portion 102 of a solid component 100. As shown in FIG. 6, the solid component may include a contour 106 (or surface). In the embodiment shown in FIG. 6, the contour 106 may be a first contour 107 of the solid component, and the solid component 100 may further include a second contour 108 (or surface). Similarly, the second laser device 15 may be configured to generate the second laser beam 17 for consolidating a second portion 104 of the solid component 100.

In exemplary embodiments, the additive manufacturing system 10 may further include at least two laser scanning devices, which may include a first laser scanning device 18 and a second laser scanning device 19. The first laser scanning device 18 may include a mirror 34 (which may be coupled to a motor 36 as shown in FIG. 1), and the mirror 34 may be rotated by the motor 36 to direct the first laser beam 16 at any desired location on the build plate 66 (e.g., in order to consolidate the solid component 100). The first laser scanning device 18 may selectively direct the first laser beam 16 across the powder bed 23 along a plurality of first hatching paths 110 (for each formative layer of the solid component 100) within the contours 106, 108 of the solid component 100, in order to irradiate the powder build material in the powder bed 23 and fabricate the first portion 102 of the solid component 100.

Similarly, the second laser scanning device 19 may include a mirror 34 (which may be coupled to a motor 36 as shown in FIG. 1), and the mirror 34 may be rotated by the motor 36 to direct the second laser beam 17 at any desired location on the build plate 66 (e.g., in order to consolidate the solid component 100). The second laser scanning device 19 may selectively direct the second laser beam 17 across the powder bed 23 along a plurality of second hatching paths 112 (for each formative layer of the solid component 100) within the contours 106, 108 of the solid component 100, in order to irradiate the powder build material in the powder bed 23 and fabricate the second portion 104 of the solid component 100.

The first hatching paths 110 and second hatching paths 112 at least partially overlap each other in the x-direction and/or y-direction in a stitching region 114. In the stitching region 114, the first laser beam 16 and the second laser beam 17 may collectively fabricate a third portion 105 of the solid component 100, which seamlessly couples the first portion 102 of solid component 100 to second portion 104 of solid component 100. As such, stitching region 114 enables first laser beam 16 to manufacture first portion 102 of solid component 100 and second laser beam 17 to manufacture second portion 104 of solid component 100 at the same time, decreasing manufacturing time and decreasing manufacturing costs.

In exemplary embodiments, the additive manufacturing system 10 may include a computing system 24 having a memory device(s) 24B and a processor(s) 24A (shown in FIG. 1). The computing system 24 may be operatively coupled with the first laser device 14, the second laser device 15, the first laser scanning device 18, and the second laser scanning device 19. The memory device(s) 24B may generally be configured to store suitable computer-readable instructions that, when implemented by the processor(s) 24A, configure the computing system 24 to perform various functions and/or operations, including, but not limited to, determining a misalignment vector field 300, which includes a plurality of misalignment vectors 250 each positioned at a respective location on the build plate 66 (shown in FIG. 5), for the additive manufacturing system 10; identifying potential stitching positions 203 (FIG. 7) where the solid component 100 is generally tangent (e.g., within ±10°) to one or more misalignment vectors 250 in the misalignment vector field 300; and generating the plurality of first hatching paths 110, the plurality of second hatching paths 112, and one or more stitching regions 114 based at least partially on the potential stitching positions 203.

As shown in FIG. 6, a reference line 152 may be extend between a first source position 154 and a second source position 156. The first source position 154 may be the location where the first laser beam 16 intersects the mirror 34 of the first laser scanning device 18, and the second source position 156 may be the location where the second laser beam 17 intersects the mirror 34 of the second laser scanning device 19. In many embodiments of the additive manufacturing system 10, one or more misalignment vectors 250 (or all of the misalignment vectors 250) in the misalignment vector field 300 may be generally parallel (e.g., within ±10%) to the reference line 152. As such, determining the misalignment vector field 300 may be at least partially based on (or entirely based on) the reference line 152. For example, in some embodiments, each misalignment vector 250 in the misalignment vector field 300 may be entirely parallel to the reference line 152. In such embodiments, the first laser scanning device 18 and the second laser scanning device 19 may be disposed at the same height in the Z direction.

Still referring to FIG. 6, the one or more stitching regions 114 may be generated by the computing system 24 at least partially based on an operational range 254, 256 of the first laser device 14 and the second laser device 15. For example, the first laser device 14 may have a first operational range 254. The first laser scanning device 18 may be operable to direct the first laser beam 16 to any position on the build plate 66 that is within the first operational range 254. Similarly, the second laser device 15 may have a second operational range 256. The second laser scanning device 19 may be operable to direct the second laser beam 17 to any position on the build plate 66 that is within the second operational range 256. The first operational range 254 and the second operational range 256 may overlap with one another in the overlapping range 258, such that both the first laser beam 16 and the second laser beam 17 may be directed to any point on the build plate 66 within the overlapping range 258. As such, in many embodiments, the one or more stitching regions 114 may be disposed within the overlapping range 258.

Figure 7:
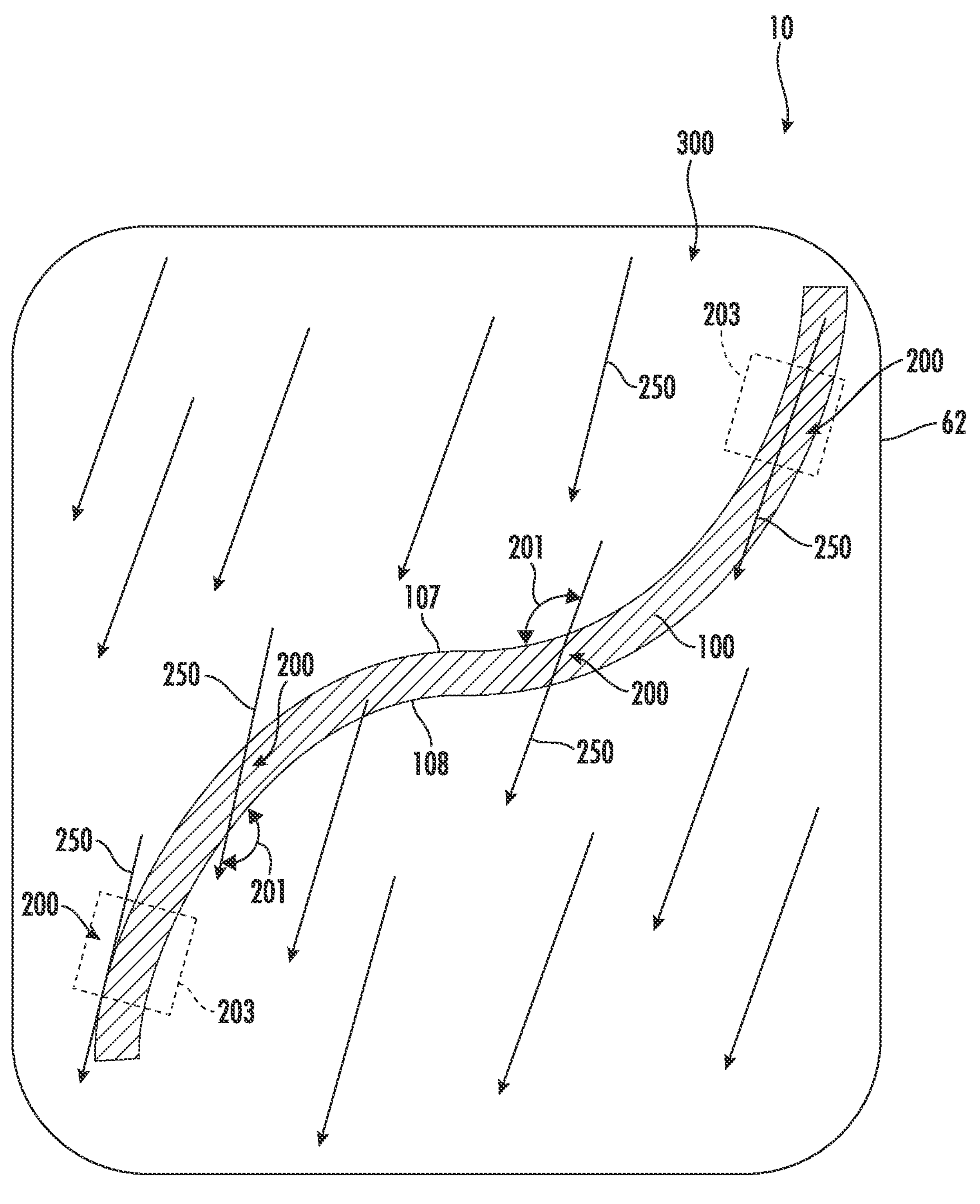
FIG. 7 is a top view of an additive manufacturing system, having a build plate, a solid component disposed on the build plate, and a misalignment vector field overlayed with the build plate, in accordance with an exemplary aspect of the present disclosure.

Referring now to FIG. 7, the additive manufacturing system 10, having a build plate 66, a solid component 100 (having a first contour 107 and a second contour 108) disposed on the build plate 66, and a misalignment vector field 300 overlayed with the build plate 66, is illustrated in accordance with embodiments of the present disclosure. The misalignment vector field 300 may include a plurality of misalignment vectors 250. Each of the misalignment vectors 250 may represent the direction and magnitude of the misalignment between the first laser beam 16 and the second laser beam 17 (FIG. 6) at a given point or region on the build plate 66.

In many embodiments, the computing system 24 may generate, for each misalignment vector 250 in the misalignment vector field 300 that at least partially overlaps (or is tangent) with the solid component 100 at an overlapping location 200, an alignment angle 201. Particularly, the alignment angle 201 may be generated for each misalignment vector 250 in the misalignment vector field 300 that intersects (or is tangent to) the first contour 107 and/or the second contour 108 of the solid component 100. The alignment angle 201 may be defined between the misalignment vector 250 and the solid component 100 (within the X, Y plane). For example, the alignment angle 201 may be defined between the misalignment vector 250 and the first contour 107, the second contour 108, or a centerline of the solid component 100. The computing system 24 may then determine when the alignment angle 201 is within an alignment angle range. In various embodiments, the alignment angle range may be between about 0° and about 10°, or such as between about 0° and about 7.5°, or such as between about 0° and about 5°. The computing system 24 may then identify potential stitching positions 203 at the overlapping locations 200 where the alignment angle 201 is within the alignment angle range. If none of the alignment angles 201 are within the alignment angle range, then the solid component 100 can be adjusted (e.g., translated or rotated) on the build plate 66 prior to the initiation of the additive manufacturing process, such that at least one misalignment vector 250 in the misalignment vector field 300 is within the alignment angle range or is generally tangent to the first contour 107, the second contour 108, or the centerline of the solid component 100.

Figures 8, 9:
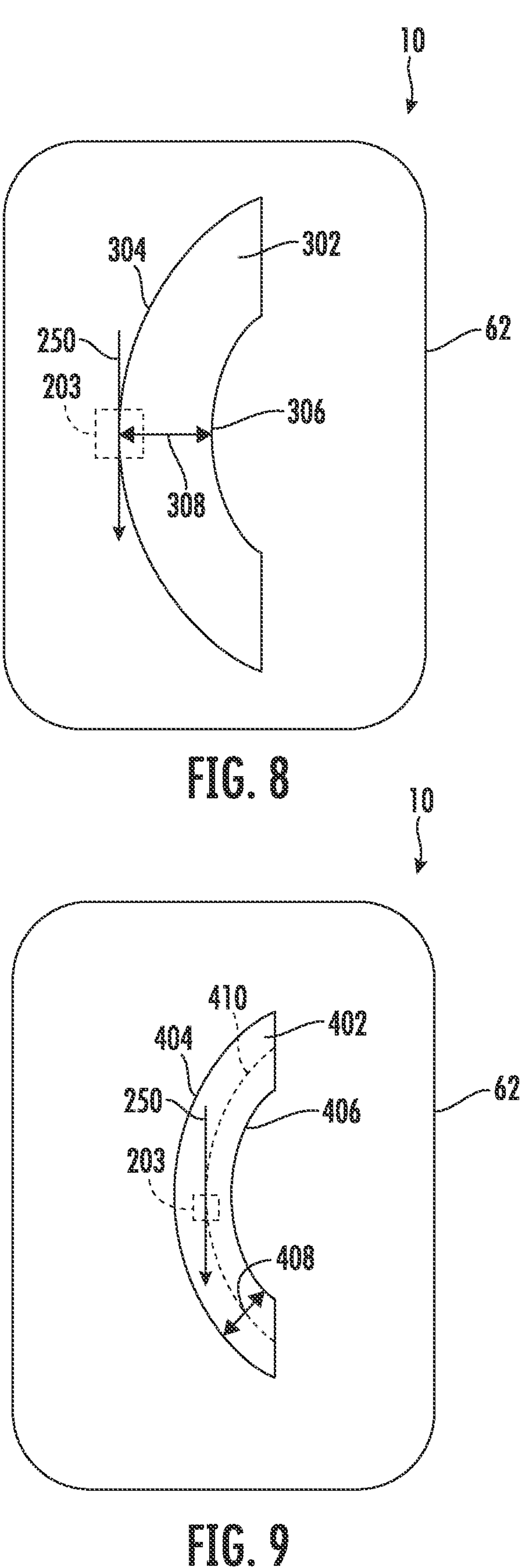
FIG. 8 is a top view of an additive manufacturing system producing a thick-walled component, in accordance with an exemplary aspect of the present disclosure.
FIG. 9 is a top view of an additive manufacturing system producing a thin-walled component, in accordance with an exemplary aspect of the present disclosure.

Referring now to FIG. 8, the additive manufacturing system 10, having a build plate 66 and a thick-walled solid component 302 is illustrated in accordance with embodiments of the present disclosure. The thick-walled solid component 302 may include a first surface or contour 304 and a second surface or contour 306. A thickness 308 may be defined between the first contour 304 and the second contour 306. The thickness 308 of the thick-walled solid component 302 may be greater than 20 hatching paths. As shown in FIG. 6, each line in the plurality of hatching paths 110, 112 may represent a single hatching path, and the thick-walled solid component 302 may be the thickness of greater than about 20 hatching paths (or such as greater than about 15 hatching paths). As shown in FIG. 8, when the additive manufacturing system 10 is being utilized to produce a thick-walled solid component 302, the computing system 24 may identify potential stitching positions 203 where the first contour 304 or the second contour 306 of the thick-walled solid component 302 is generally tangent to one or more misalignment vectors 250 in the misalignment vector field 300.

Referring now to FIG. 9, the additive manufacturing system 10, having a build plate 66 and a thin-walled solid component 402 is illustrated in accordance with embodiments of the present disclosure. The thin-walled solid component 402 may include a first surface or contour 404 and a second surface or contour 406. A thickness 408 may be defined between the first contour 404 and the second contour 406. The thickness 408 of the thin-walled solid component 402 may be between about 1 hatching path and about 20 hatching paths. As shown in FIG. 6, each line in the plurality of hatching paths 110, 112 may represent a single hatching path, and a thin-walled solid component may be the thickness of between about 1 hatching path and about 20 hatching paths (or such as between about 5 hatching paths and about 15 hatching paths). As shown in FIG. 9, when the additive manufacturing system 10 is being utilized to produce a thin-walled component 402, the computing system 24 may identify potential stitching positions 203 where a centerline 410 of the thin-walled solid component 402 is generally tangent to one or more misalignment vectors 250 in the misalignment vector field 300.

Figure 10:
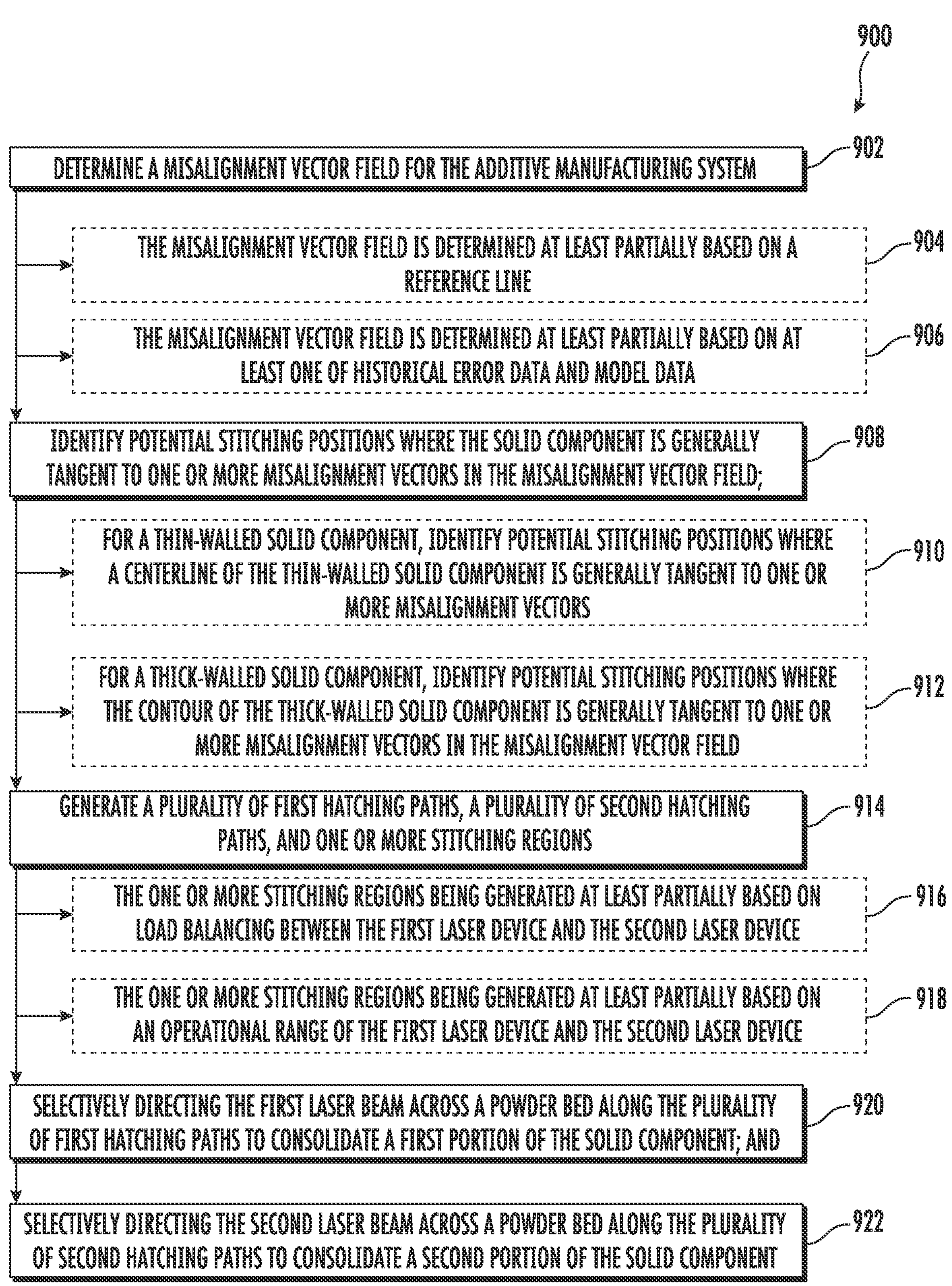
FIG. 10 illustrates a flow diagram a method for manufacturing a solid component with an additive manufacturing system, in accordance with exemplary embodiments of the present disclosure.

Referring now to FIG. 10, a flow diagram of one embodiment of a method 900 for manufacturing a solid component with an additive manufacturing system. The additive manufacturing system may include at least two laser devices and at least two laser scanning devices. The at least two laser devices include a first laser device and a second laser device. The at least two laser scanning devices include a first laser scanning device and a second laser scanning device.

In general, the method 900 will be described herein with reference to the additive manufacturing system 10 described above with reference to FIGS. 1-9. However, it will be appreciated by those of ordinary skill in the art that the disclosed method 900 may generally be utilized with any suitable additive manufacturing system 10 and/or may be utilized in connection with a system having any other suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Additionally, dashed boxes in flow diagram of FIG. 10 indicate optional steps in the method 900.

As shown in FIG. 10, the method 900 may include at (902) determining a misalignment vector field for the additive manufacturing system. In many implementations, the misalignment vector field may include a plurality of misalignment vectors. As should be appreciated, a misalignment vector may be generated, or estimated, for each point on the build plate that the first laser beam and the second laser beam may be directed (e.g., within the overlapping range discussed above). Each misalignment vector in the misalignment vector field may represent the direction and magnitude between the first laser beam and the second laser beam at the particular point on the build plate.

In many implementations, the method 900 may include at (904) determining the misalignment vector field for the additive manufacturing system is based at least partially on a reference line extending between a first source position of the first laser beam and a second source position of the second laser beam. The first source position may be the location where the first laser beam intersects the mirror of the first scanning device, and the second source position may be the location where the second laser beam intersects the mirror of the second scanning device. In some embodiments, one or more misalignment vectors (or all of the misalignment vectors) in the misalignment vector field may be generally parallel (e.g., within ±10%) to the reference line. As such, determining the misalignment vector field may be at least partially based on (or entirely based on) the reference line. For example, in some embodiments, each misalignment vector in the misalignment vector field may be entirely parallel to the reference line. In such embodiments, the first scanning device and the second scanning device may be disposed at the same height in the Z direction.

In various implementations, the method 900 may include at (906) determining the misalignment vector based at least partially one or more of historical error data and/or model data. Historical error data may include error data (or misalignment data) from previous production processes (i.e., previous prints) on an additive manufacturing machine. Additionally, historical error data may include data from previous calibration procedures. Model data may include part-specific data, such as data on the geometry of the solid component. Further, model data may include data from a model of the additive manufacturing system 10. For example, the model of the additive manufacturing system 10 may determine changes in the misalignment vector when the system heats up (thermally expands), vibrates, etc.

In exemplary implementations, the method 900 may further include at (908) identifying potential stitching positions where the solid component is generally tangent to one or more misalignment vectors in the misalignment vector field. Particularly, the method 900 may include generating, for each misalignment vector in the plurality of misalignment vectors that at least partially overlaps (or is tangent) with the solid component at an overlapping location, an alignment angle. The alignment angle may defined between the misalignment vector and the solid component (e.g., between the overlapping misalignment vector and a first contour, a second contour, or a centerline of the solid component). The method 900 may include determining, for each overlapping location, when the alignment angle is within an alignment angle range (e.g., within 0°-10°). As should be appreciated, the alignment angles being closest to 0° will be best for a potential stitching position because it will ensure no surface defects on the solid component.

In various implementations, in which the solid component is a thin-walled solid component, the method 900 may include at (910) identifying potential stitching positions where a centerline of the thin-walled solid component is generally tangent to one or more misalignment vectors in the misalignment vector field. By contrast, in other implementations, in which the solid component is a thick-walled solid component, the method 900 may include at (912) identifying potential stitching positions where the contour of the thick-walled solid component is generally tangent to one or more misalignment vectors in the misalignment vector field.

In certain implementations, the method 900 may include at (914) generating a plurality of first hatching paths, a plurality of second hatching paths, and one or more stitching regions. The plurality of first hatching paths and the plurality of second hatching paths may overlap with one another at the one or more stitching regions. Additionally, the one or more stitching regions may be based at least partially on the potential stitching positions (e.g., where the misalignment vector is tangent to the surface or centerline of the solid component).

In many embodiments, the method may include at (916) generating the one or more stitching regions based at least partially on load balancing between the first laser device and the second laser device. Load balancing may include distributing the workload evenly (or as close to evenly as possible) between the first laser device and the second laser device. For example, the one or more stitching regions may be generated based at least partially on favorable load balancing between the first laser device and the second laser device, such that one laser device does not perform solely consolidate more than 80% of the solid component, or such as no more than 70%, or such as no more than 60%. Additionally, in various implementations, load balancing may include ensuring that the first laser device and the second laser device do not interact with one another. For example, when one laser is welding, weld gases and soot may be generated, which may block the other laser, and as such, load balancing may ensure that the lasers do not interact with one another.

Additionally, in many embodiments, the method 900 may include at (918) generating the one or more stitching regions is based at least partially on an operational range of the first laser device and the second laser device. For example, the first laser device may have a first operational range. The first scanning device may be operable to direct the laser to any position on the build plate that is within the first operational range. Similarly, the second laser device may have a second operational range. The second scanning device may be operable to direct the laser to any position on the build plate that is within the second operational range. The first operational range and the second operational range may overlap with one another in the overlapping range, such that both the first laser and the second laser may be directed to any point on the build plate within the overlapping range. As such, in many embodiments, generating the one or more stitching regions may be based on the overlapping range to ensure both the first laser and the second laser can reach the stitching region.

In exemplary embodiments, once the plurality of first hatching paths and the plurality of second hatching paths are generated, the method 900 may include at (920) selectively directing the first laser beam across a powder bed along the plurality of first hatching paths to consolidate a first portion of the solid component. Additionally, the method 900 may include at (922) selectively directing the second laser beam across the powder bed along the plurality of second hatching paths to consolidate a second portion of the solid component. Further, both the first laser beam and the second laser beam may collectively consolidate the third portion of the solid component in the stitching region.

Positioning the stitching region in areas where the misalignment vector is tangent to the surface (and/or the centerline) of the solid component advantageously minimizes or completely eliminates surface defects that could otherwise occur in the solid component. Stated otherwise, surface defects in an additively manufactured component, that would otherwise be caused by misalignment between one or more lasers in a multi-laser additive manufacturing system, may be reduced and/or entirely eliminated by positioning the misalignment vector tangent to the surface (or tangent to a centerline) of the additively manufactured component.

Further aspects are provided by the subject matter of the following clauses:

An additive manufacturing system for producing a solid component, the additive manufacturing system comprising: a first laser device configured to generate and direct a first laser beam; a second laser device configured to generate and direct a second laser beam to consolidate a second portion of the solid component; a computing system including memory and one or more processors, the memory storing instructions that, when executed by the one or more processors, cause the additive manufacturing system to perform operations comprising: determining a misalignment vector field for the additive manufacturing system, the misalignment vector field comprising a plurality of misalignment vectors; identifying one or more potential stitching positions where the solid component is tangent to one or more misalignment vectors in the misalignment vector field; generating a plurality of first hatching paths, a plurality of second hatching paths, and one or more stitching regions, wherein the plurality of first hatching paths and the plurality of second hatching paths overlap at the one or more stitching regions, and wherein the one or more stitching regions are based at least partially on the one or more potential stitching positions; direct the first laser beam along the plurality of first hatching paths; and direct the second laser beam along the plurality of second hatching paths.

The additive manufacturing system of any preceding clause, wherein determining the misalignment vector field for the additive manufacturing system is based at least partially on a reference line extending between a first source position of the first laser beam and a second source position of the second laser beam.

The additive manufacturing system of any preceding clause, wherein the solid component is a thin-walled solid component, and wherein identifying the one or more potential stitching positions further comprises: identifying one or more potential stitching positions where a centerline of the thin-walled solid component is tangent to one or more of the plurality of misalignment vectors in the misalignment vector field.

The additive manufacturing system of any preceding clause, wherein the solid component is a thick-walled solid component, and wherein identifying the one or more potential stitching positions further comprises: identifying one or more potential stitching positions where the contour of the thick-walled solid component is tangent to one or more of the plurality of misalignment vectors in the misalignment vector field.

The additive manufacturing system of any preceding clause, wherein identifying the one or more potential stitching positions further comprises: generating, for each misalignment vector in the plurality of misalignment vectors that at least partially overlaps with the solid component at an overlapping location, an alignment angle, wherein the alignment angle is defined between the misalignment vector and the solid component; determining, for each overlapping location, when the alignment angle is within an alignment angle range; and identifying a potential stitching position of the one or more potential stitching positions at the overlapping locations where the alignment angle is within the alignment angle range.

The additive manufacturing system of any preceding clause, wherein the alignment angle range is between about 0° and about 10°.

The additive manufacturing system of any preceding clause, wherein determining the misalignment vector field is based at least partially one or more of historical error data and model data.

The additive manufacturing system of any preceding clause, wherein generating the one or more stitching regions is based at least partially on load balancing between the first laser device and the second laser device.

The additive manufacturing system of any preceding clause, wherein generating the one or more stitching regions is based at least partially on an operational range of the first laser device and the second laser device.

A method for manufacturing a solid component with an additive manufacturing system, the additive manufacturing system including a first laser device configured to generate and direct a first laser beam and a second laser device configured to generate and direct a second laser beam, the method comprising: determining a misalignment vector field for the additive manufacturing system, the misalignment vector field comprising a plurality of misalignment vectors; identifying one or more potential stitching positions where the solid component is tangent to one or more misalignment vectors in the misalignment vector field; generating a plurality of first hatching paths, a plurality of second hatching paths, and one or more stitching regions, wherein the plurality of first hatching paths and the plurality of second hatching paths overlap at the one or more stitching regions, and wherein the one or more stitching regions are based at least partially on the one or more potential stitching positions; selectively directing the first laser beam across a powder bed along the plurality of first hatching paths to consolidate a first portion of the solid component; and selectively directing the second laser beam across the powder bed along the plurality of second hatching paths to consolidate a second portion of the solid component.

The method of any preceding clause, wherein determining the misalignment vector field for the additive manufacturing system is based at least partially on a reference line extending between a first source position of the first laser beam and a second source position of the second laser beam.

The method of any preceding clause, wherein the solid component is a thin-walled solid component, and wherein identifying the one or more potential stitching positions further comprises: identifying one or more potential stitching positions where a centerline of the thin-walled solid component is tangent to one or more of the plurality of misalignment vectors in the misalignment vector field.

The method of any preceding clause, wherein the solid component is a thick-walled solid component, and wherein identifying the one or more potential stitching positions further comprises: identifying one or more potential stitching positions where a contour of the thick-walled solid component is tangent to one or more of the plurality of misalignment vectors in the misalignment vector field.

The method of any preceding clause, wherein identifying the one or more potential stitching positions further comprises: generating, for each misalignment vector in the plurality of misalignment vectors that at least partially overlaps with the solid component at an overlapping location, an alignment angle, wherein the alignment angle is defined between the misalignment vector and the solid component; determining, for each overlapping location, when the alignment angle is within an alignment angle range; and identifying a potential stitching position of the one or more potential stitching positions at the overlapping locations where the alignment angle is within the alignment angle range.

The method of any preceding clause, wherein the alignment angle range is between about 0° and about 10°.

The method of any preceding clause, wherein determining the misalignment vector field is based at least partially one or more of historical error data and model data.

The method of any preceding clause, wherein generating the one or more stitching regions is based at least partially on load balancing between the first laser device and the second laser device.

The method of any preceding clause, wherein generating the one or more stitching regions is based at least partially on an operational range of the first laser device and the second laser device.

We claim:

1. An additive manufacturing system for producing a solid component, the additive manufacturing system comprising:

a first laser device configured to generate and direct a first laser beam;

a second laser device configured to generate and direct a second laser beam;

a computing system including memory and one or more processors, the memory storing instructions that, when executed by the one or more processors, cause the additive manufacturing system to perform operations comprising:

determining a misalignment vector field for the additive manufacturing system, the misalignment vector field comprising a plurality of misalignment vectors;

identifying one or more potential stitching positions where the solid component is tangent to one or more misalignment vectors in the misalignment vector field;

generating a plurality of first hatching paths, a plurality of second hatching paths, and one or more stitching regions, wherein the plurality of first hatching paths and the plurality of second hatching paths overlap at the one or more stitching regions, and wherein the one or more stitching regions are based at least partially on the one or more potential stitching positions;

direct the first laser beam along the plurality of first hatching paths; and direct the second laser beam along the plurality of second hatching paths.

2. The additive manufacturing system of claim 1, wherein determining the misalignment vector field for the additive manufacturing system is based at least partially on a reference line extending between a first source position of the first laser beam and a second source position of the second laser beam.

3. The additive manufacturing system of claim 1, wherein the solid component is a thin-walled solid component, and wherein identifying the one or more potential stitching positions further comprises:

identifying one or more potential stitching positions where a centerline of the thin-walled solid component is tangent to one or more of the plurality of misalignment vectors in the misalignment vector field.

4. The additive manufacturing system of claim 1, wherein the solid component is a thick-walled solid component, and wherein identifying the one or more potential stitching positions further comprises:

identifying one or more potential stitching positions where a contour of the thick-walled solid component is tangent to one or more of the plurality of misalignment vectors in the misalignment vector field.

5. The additive manufacturing system of claim 1, wherein identifying the one or more potential stitching positions further comprises:

generating, for each misalignment vector in the plurality of misalignment vectors that at least partially overlaps with the solid component at an overlapping location, an alignment angle, wherein the alignment angle is defined between the misalignment vector and the solid component;

determining, for each overlapping location, when the alignment angle is within an alignment angle range; and identifying a potential stitching position of the one or more potential stitching positions at the overlapping locations where the alignment angle is within the alignment angle range.

6. The additive manufacturing system of claim 5, wherein the alignment angle range is between about 0° and about 10°.

7. The additive manufacturing system of claim 1, wherein determining the misalignment vector field is based at least partially one or more of historical error data and model data.

8. The additive manufacturing system of claim 1, wherein generating the one or more stitching regions is based at least partially on load balancing between the first laser device and the second laser device.

9. The additive manufacturing system of claim 1, wherein generating the one or more stitching regions is based at least partially on an operational range of the first laser device and the second laser device.

10. A method for manufacturing a solid component with an additive manufacturing system, the additive manufacturing system including a first laser device configured to generate and direct a first laser beam and a second laser device configured to generate and direct a second laser beam, the method comprising:

determining a misalignment vector field for the additive manufacturing system, the misalignment vector field comprising a plurality of misalignment vectors;

identifying one or more potential stitching positions where the solid component is tangent to one or more misalignment vectors in the misalignment vector field;

generating a plurality of first hatching paths, a plurality of second hatching paths, and one or more stitching regions, wherein the plurality of first hatching paths and the plurality of second hatching paths overlap at the one or more stitching regions, and wherein the one or more stitching regions are based at least partially on the one or more potential stitching positions;

selectively directing the first laser beam across a powder bed along the plurality of first hatching paths to consolidate a first portion of the solid component; and selectively directing the second laser beam across the powder bed along the plurality of second hatching paths to consolidate a second portion of the solid component.

11. The method of claim 10, wherein determining the misalignment vector field for the additive manufacturing system is based at least partially on a reference line extending between a first source position of the first laser beam and a second source position of the second laser beam.

12. The method of claim 10, wherein the solid component is a thin-walled solid component, and wherein identifying the one or more potential stitching positions further comprises:

identifying one or more potential stitching positions where a centerline of the thin-walled solid component is tangent to one or more of the plurality of misalignment vectors in the misalignment vector field.

13. The method of claim 10, wherein the solid component is a thick-walled solid component, and wherein identifying the one or more potential stitching positions further comprises:

identifying one or more potential stitching positions where a contour of the thick-walled solid component is tangent to one or more of the plurality of misalignment vectors in the misalignment vector field.

14. The method of claim 10, wherein identifying the one or more potential stitching positions further comprises:

generating, for each misalignment vector in the plurality of misalignment vectors that at least partially overlaps with the solid component at an overlapping location, an alignment angle, wherein the alignment angle is defined between the misalignment vector and the solid component;

determining, for each overlapping location, when the alignment angle is within an alignment angle range; and identifying a potential stitching position of the one or more potential stitching positions at the overlapping locations where the alignment angle is within the alignment angle range.

15. The method of claim 14, wherein the alignment angle range is between about 0° and about 10°.

16. The method of claim 10, wherein determining the misalignment vector field is based at least partially one or more of historical error data and model data.

17. The method of claim 10, wherein generating the one or more stitching regions is based at least partially on load balancing between the first laser device and the second laser device.

18. The method of claim 10, wherein generating the one or more stitching regions is based at least partially on an operational range of the first laser device and the second laser device.

* * * * *